United States Patent
Subramanian et al.

(10) Patent No.: US 7,032,800 B2
(45) Date of Patent: Apr. 25, 2006

(54) APPARATUS AND METHOD FOR FRICTION STIR WELDING OF HIGH STRENGTH MATERIALS, AND ARTICLES MADE THEREFROM

(75) Inventors: Pazhayannur Ramanathan Subramanian, Niskayuna, NY (US); Bernard Patrick Bewlay, Schenectady, NY (US); Earl Claude Helder, Cincinnati, OH (US); Timothy Joseph Trapp, Upper Arlington, OH (US)

(73) Assignee: General Electric Company, Niskayuna, NY (US)

(*) Notice: Subject to any disclaimer, the term of this patent is extended or adjusted under 35 U.S.C. 154(b) by 86 days.

(21) Appl. No.: 10/452,420

(22) Filed: May 30, 2003

(65) Prior Publication Data

US 2004/0238599 A1 Dec. 2, 2004

(51) Int. Cl.
*B23K 20/12* (2006.01)
*B23K 37/00* (2006.01)

(52) U.S. Cl. .................. 228/2.1; 228/112.1

(58) Field of Classification Search .............. 228/2.1, 228/2.3, 112.1
See application file for complete search history.

(56) References Cited

U.S. PATENT DOCUMENTS

| | | | |
|---|---|---|---|
| 5,460,317 A | | 10/1995 | Thomas et al. |
| 6,457,629 B1* | | 10/2002 | White .................... 228/112.1 |
| 6,585,148 B1* | | 7/2003 | Aono et al. ............. 228/112.1 |
| 2003/0075584 A1* | | 4/2003 | Sarik et al. .............. 228/2.1 |
| 2004/0056075 A1* | | 3/2004 | Gheorghe ................ 228/199 |

* cited by examiner

*Primary Examiner*—Lynne R. Edmondson
(74) *Attorney, Agent, or Firm*—Paul J. DiConza; William E. Powell, III

(57) ABSTRACT

An apparatus for friction stir welding, a weld tool for friction stir welding, and a method for making a weld tool for friction stir welding are presented. The weld tool comprises a tungsten-based refractory material. A method for manufacturing an article, where the method comprises providing the apparatus for friction stir welding, and the article produced by this method are also presented.

69 Claims, 1 Drawing Sheet

APPARATUS AND METHOD FOR FRICTION STIR WELDING OF HIGH STRENGTH MATERIALS, AND ARTICLES MADE THEREFROM

This invention was first conceived or reduced to practice in the performance of work under Contract No. F33615-99-2-5215 with the United States Air Force. The United States of America may have certain rights to this invention.

BACKGROUND OF THE INVENTION

This invention relates to welding technology. More particularly, this invention relates to friction stir welding of metal components. This invention also relates to articles made using friction stir welding.

The continuing effort to design and build more powerful and more efficient turbo-machinery such as, for example, gas and steam turbines, requires the use of materials having enhanced high temperature performance capabilities. However, the performance enhancements in such exemplary properties as strength and creep resistance obtained in many state-of-the-art turbine materials often come at the expense of other properties, and a trade-off is observed. For example, many high-temperature nickel-based alloys show markedly increased susceptibility to cracking when joined by conventional welding technology. The melting and solidification associated with conventional welding causes localized degradation in the properties of many of such materials. As a result, these alloys are not usable in machine designs that require significant use of conventionally welded structures. The cost-effective assembly of complex machine components by welding sub-components made by casting or forging metal alloys is recognized to be desirable in the industry, and so the inability to use certain high-performance materials in such welded assemblies is a significant limitation.

Solid-state welding processes have been developed as a way of addressing this issue. These processes join metal components without melting, thereby avoiding the effects associated with traditional welding techniques. Typical solid-state techniques, such as inertia welding and translational friction welding, have been used as alternatives to conventional welding in the turbine industry, but these techniques are restricted to forming joints of simple geometries of relatively limited sizes. However, one solid-state welding technique, known as "friction stir welding" (also referred to herein as "FSW") is capable of producing large welds in a variety of geometric configurations not available to other such processes. In this process, a non-consumable, rotating cylindrical tool is plunged into a rigidly clamped workpiece, and then traversed along the joint to be welded. The tool is specially designed to provide a combination of frictional heat and thermo-mechanical working to the workpiece material as the tool traverses along the joint. A strong, solid-state bond is formed in the wake of the tool.

Friction stir welding was developed originally by The Welding Institute, Great Abington, UK, for joining aluminum alloys that were difficult to weld by conventional processes. Although successful in joining these relatively soft materials, expanding the application of FSW to harder, stronger materials, such as, for example, nickel and titanium alloys, has proven to be difficult due to the propensity of the tool to degrade during the welding process. Much of the degradation may be attributed to the high heat and stresses generated during FSW of these high-strength materials.

Therefore, there is a need to provide welding tools, apparatus, and methods that are capable of reliably joining components made of high-strength materials by FSW. There is a further need for the articles made using these apparatus and methods.

BRIEF DESCRIPTION

Embodiments of the present invention address these and other needs. One embodiment is an apparatus for friction stir welding comprising a weld tool. The weld tool comprises a tungsten-based refractory material. Another embodiment of the present invention is a weld tool for friction stir welding. The weld tool comprises a tungsten-based refractory material.

A third embodiment is a method for making a weld tool for friction stir welding. The method comprises providing a tungsten-based refractory material, processing the metal to form a substantially self-supporting feedstock, working the feedstock, wherein working reduces a cross-sectional area of the feedstock by at least 50%, and fashioning the feedstock into a weld tool adapted to operate in a friction stir welding apparatus.

A fourth embodiment is a method for manufacturing an article. The method comprises providing a friction stir welding apparatus, wherein the apparatus comprises a weld tool, the weld tool comprising a tungsten-based refractory material; providing at least one workpiece; and operating the apparatus to weld the at least one workpiece by friction stir welding to form at least one welded element, the at least one welded element comprising a friction stir welded region.

A fifth embodiment is an article manufactured by the above method.

BRIEF DESCRIPTION OF THE DRAWINGS

These and other features, aspects, and advantages of the present invention will become better understood when the following detailed description is read with reference to the accompanying drawing in which like characters represent like parts throughout the drawings, wherein.

DETAILED DESCRIPTION

Figure 1:
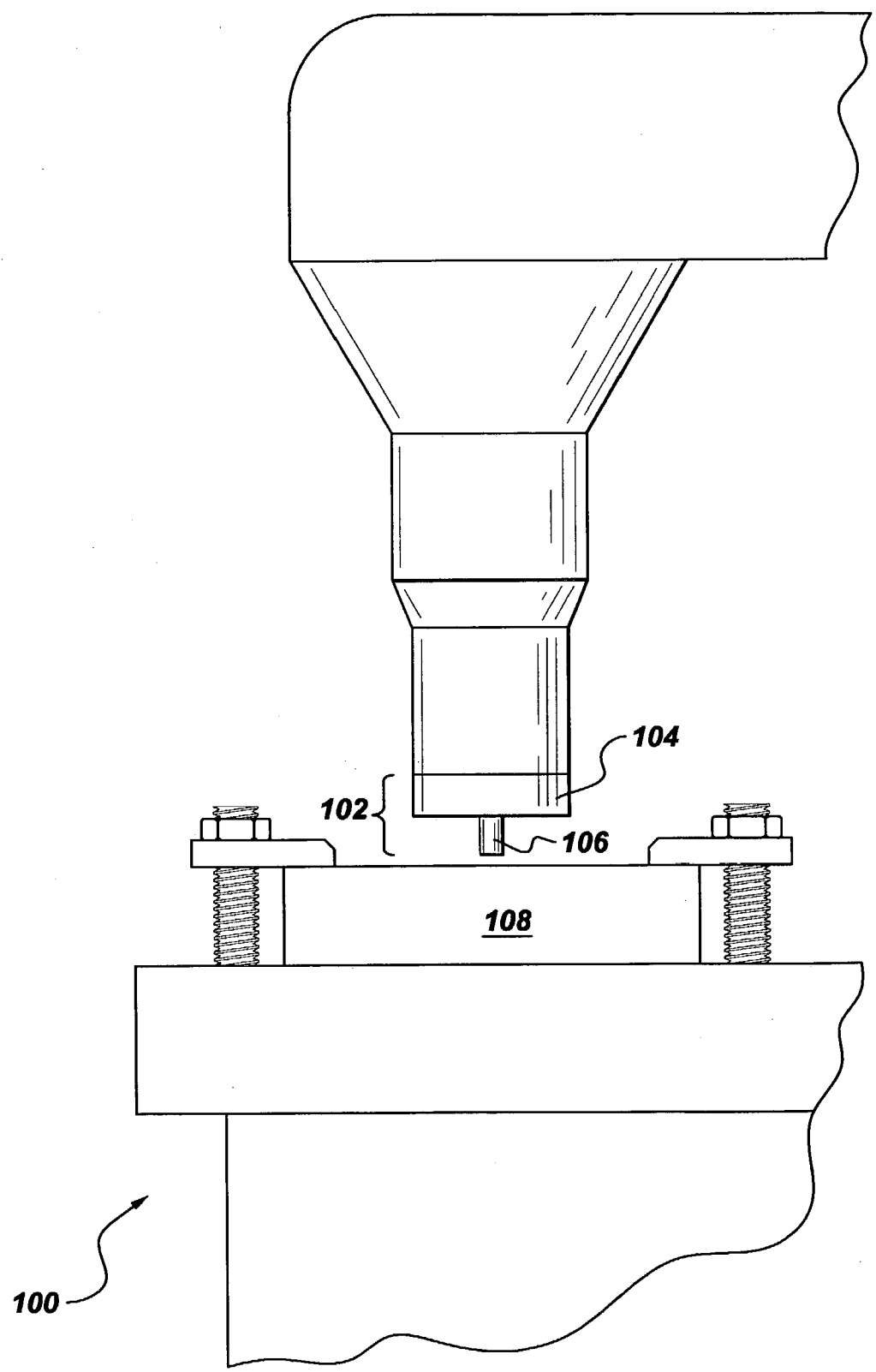
FIG. 1 is a schematic of an apparatus in accordance with embodiments of the present invention.

Referring to FIG. 1, an apparatus 100 in accordance with embodiments of the present invention comprises a weld tool 102. Weld tool 102 comprises a tungsten-based refractory material. As used herein, the term "tungsten-based" refers to materials in which the largest fraction by weight of the material composition is tungsten. High-strength materials, including, but not limited to, nickel and titanium alloys, have been successfully joined by FSW using these tungsten-based materials as weld tools 102 in an FSW apparatus 100. Certain tool materials from this class have been found to resist degradation during FSW of high strength materials, advantageously providing joints substantially free of the tool debris commonly observed where traditional FSW tool materials are employed. Tool debris lodged in the joint degrades the strength and other properties of the bond, and thus the use of the tool materials of the present invention improve the overall quality of joints formed by FSW.

Certain tungsten-based refractory metals have proven to be particularly effective for use as tools 102 in FSW apparatus employed to join high strength materials. Several of these materials are presented in the following discussion, but these particular embodiments should not be construed to limit the scope of the present invention.

In some embodiments, the tungsten-based refractory material comprises an alloy consisting essentially of tungsten, and in particular embodiments the alloy consists essentially of sintered tungsten. Sintered tungsten is made of tungsten powder that as been compressed and consolidated at elevated temperatures below the melting point of tungsten, according to procedures well known in the art, thereby compacting the powder in the solid state. This material has been effective in welding titanium alloys such as Ti 6-4 (Ti-6% aluminum—4% vanadium, all percentages by weight) and nickel based superalloys such as Alloy 718.

In other embodiments, the tungsten-based refractory material comprises doped tungsten, wherein the doped tungsten comprises dopant material and tungsten. As used herein, the term "doped" means one or more secondary components, termed "dopant material," has been added to the tungsten. In certain embodiments, the doped tungsten comprises a concentration of up to 100 parts per million of the dopant material, and in particular embodiments the concentration of the dopant material is in the range from about 10 parts per million to about 80 parts per million. Suitable dopant materials include, but are not limited to, lithium, sodium, potassium, rubidium, cesium, lanthanum oxide, yttrium oxide, cerium oxide, and thorium oxide. In one exemplary embodiment, the dopant material comprises potassium in a concentration of about 20 parts per million. In some embodiments, the doped tungsten is sintered and extruded doped tungsten, in accordance to methods commonly used in the art. Processing the doped tungsten by sintering and extruding appears to provide the material with advantageous levels of strength for use as a tool 102 in a FSW apparatus 100 applied to join high-strength materials. Plates of Ti 6-4 and Ti-5% Al—2% tin—4% molybdenum—2% zirconium—4% chromium (also known as "Ti17" alloy, all percentages by weight) have been successfully welded using this tool material.

In alternative embodiments, the tungsten-based refractory material comprises an alloy, where the alloy comprises a solid-solution-strengthening material and tungsten. As used herein, the term "solid-solution-strengthening material" means one or more elements added to the tungsten that dissolve into the tungsten crystal structure without forming secondary phases, strengthening the tungsten by straining its crystal lattice. Examples of solid-solution-strengthening material include, but are not limited to, rhenium, molybdenum, tantalum, niobium, and mixtures thereof. In some embodiments, the alloy comprises up to about 40 weight percent of the solid-solution-strengthening material, and in specific embodiments, the alloy comprises from about 20 weight percent to about 30 weight percent of the solid-solution-strengthening material. In an exemplary embodiment, the alloy comprises about 25 weight percent rhenium and the balance comprises tungsten. In some embodiments, the alloy comprises at least one of a) sintered material and b) sintered and hot isostatically pressed material. Material processed by one of these exemplary methods, using procedures and parameters well known in the art, appears to provide suitably dense, strong material from which FSW tools 102 having advantageous properties may be manufactured. Titanium alloys and nickel alloys have been successfully welded by FSW using this tool material.

In a further alternative embodiment of the apparatus 100 of the present invention, the tungsten-based refractory material of tool 102 comprises tungsten and at least one material selected from the group consisting of a solid-solution-strengthening material and a refractory carbide material. This tool material has been shown to be effective in joining titanium alloys. Suitable examples of solid-solution-strengthening material have been set forth above. Refractory carbide materials appropriate for this embodiment include, but are not limited to, carbides of refractory transition metals such as hafnium, zirconium, tantalum, and niobium. In certain embodiments, the solid-solution-strengthening material is present within the tungsten-based refractory material at a concentration up to about 8 weight percent, and the refractory carbide material is present within the tungsten-based refractory material a concentration in the range from about 0.25 weight percent to about 2 weight percent. In particular embodiments, the concentration range of the solution-strengthening material is from about 2 weight percent to about 6 weight percent, and the carbide concentration range is from about 0.25 weight percent to about 1 weight percent. In an exemplary embodiment, the tungsten-based refractory material comprises about 4 percent rhenium and about 0.5 percent hafnium carbide (concentrations in weight percent), with the balance comprising tungsten.

The tool material of the embodiments described above comprises one of a) cast and extruded material; b) cast and forged material; c) consolidated and extruded material, in certain embodiments. Each of these alternative processing routes is well known in the art, and the practitioner will recognize suitable variations among several commonly practiced metal-forming techniques. An example of consolidated and extruded material is material that is first isostatically pressed at relatively low temperature (Cold Isostatically Pressed, or CIP), then sintered, hot isostatically pressed, and finally extruded. The resulting material is dense and sufficiently strong to serve as a tool 102 in embodiments of the present invention.

Tool 102 may be completely made of one material, or, in some cases, it may be made using a combination of materials. For example, in certain embodiments weld tool 102 has a shoulder portion 104 that comprises a material substantially different from the material comprising a pin portion 106 in at least one characteristic such as, for example, chemical composition, microstructure, or processing. In these cases the pin portion 106 comprises a tungsten-based refractory material. The pin portion 106 may thus exist as an insert fastened to the shoulder portion 104 of tool 102, allowing for a modular tool system that allows for expedient replacement of pin 106 without the need to remove the entire tool 102.

In addition to the FSW apparatus 100 described above, embodiments of the present invention also include weld tool 102 and all of its alternatives described previously.

A method for making weld tool 102 is included as a further embodiment. In this method, a tungsten-based refractory material is provided. This material is identical to that described for tool 102, above. The material is then processed to form a substantially self-supporting feedstock. The term "substantially self-supporting" means that the feedstock produced during the processing step is sufficiently strong to support its own weight without a significant amount of distortion. The state described by this term may be contrasted with a powder or a slurry, which cannot support its own weight without collapsing or otherwise significantly distorting. Processing in embodiments of the present invention may include using any of several suitable methods for solidifying metals from liquid, such as any of various casting methods known in the art. Moreover, processing also may include applying methods for compacting solid powders, such as sintering and isostatic pressing. Finally, any of various processes whereby solid raw materials are melted and deposited, including, for example, are deposition, plasma spray deposition, and laser deposition, are suitable for inclusion in the processing step of this embodiment.

After the tungsten-based refractory material has been processed to form the feedstock, the feedstock is then worked to reduce its cross-sectional area by at least 50%.

Working the feedstock to this degree strain-hardens the feedstock material to a point where it advantageously resists degradation during the demanding stress and temperature conditions endured by tool 102 during FSW of high-strength materials. In particular embodiments, the feedstock is worked further still, to reduce its cross sectional area by at least 75%, allowing for even further strain-hardening of the feedstock. The feedstock may be worked by any suitable metalworking process, including, for example, extruding, swaging, and forging. Combinations and sequences of different metalworking processes are also suitable to achieve the desired reduction in cross-sectional area of the feedstock.

After working the feedstock to the desired state, the feedstock is then fashioned into weld tool 102. Fashioning the feedstock into tool 102 may include the use of metalworking operations as described above as well as any of various machining operations, including cutting, tapping, grinding, honing, polishing, and the like. The end result is a tool 102 adapted to operate in a friction stir welding apparatus 100. A tool 102 is adapted to operate in apparatus 100 if the tool 102 has a size and shape suitable for proper attachment to and operation in a FSW apparatus 100.

A further embodiment of the present invention is a method for manufacturing an article, as well as the article formed by such method. In this method, a friction stir welding apparatus 100 is provided. Apparatus 100 comprises a weld tool 102, and weld tool 102 comprises a tungsten-based refractory material. Tool 102 and the material used to make tool 102 are identical to that described in previous embodiments. The method further comprises providing at least one workpiece 108, and operating the apparatus 100 to weld the at least one workpiece 108 by friction stir welding to form at least one welded element (not shown), the at least one welded element comprising a friction stir welded region.

As stated above, at least one workpiece 108 is provided. The use of tool 102 made of the materials previously described, and manufactured according to the above tool 102 manufacturing methods, enables FSW of high-strength materials. Accordingly, suitable materials for use in the method of the present invention include, but are not limited to a steel, a stainless steel, a nickel-based superalloy, a cobalt-based superalloy, an iron-based superalloy, a nickel-iron-based superalloy, an oxide dispersion strengthened nickel alloy, and a titanium-based alloy. The processing used to form workpiece 108 does not generally affect the applicability of the FSW method of the present invention, and so the workpiece 108 may be, for example, an item made by forging, casting, extruding, rolling, or by powder metallurgy processes.

In certain embodiments, a plurality of workpieces 108 is provided. In such cases, apparatus 100 is operated to weld the plurality of workpieces 108 using FSW to form one or more welded elements. Each welded element formed by the process comprises a friction stir-welded region, such as, for example, a joint region bonding two or more formerly separate workpieces into a welded element. In certain embodiments, the one or more welded elements are the finished articles manufactured by the process. However, in alternative embodiments, the one or more welded elements are further assembled to form the article, and in particular embodiments the assembly is done, at least in part, by friction stir welding at least two of the welded elements together to join the elements.

The FSW method of the present invention is flexible as to the composition of the various provided workpieces. For example, in some embodiments, a first workpiece comprises a first material, and a second workpiece comprises a second material, and the two materials are different from one another with respect to at least one characteristic such as chemical composition, microstructure, and processing. Either or both of the first and second materials may be a material that is difficult to FSW by conventional methods, such as, for example, a steel, a stainless steel, a nickel-based superalloy, a cobalt-based superalloy, an iron-based superalloy, a nickel-iron-based superalloy, an oxide dispersion strengthened nickel alloy, or a titanium-based alloy. As another example, a polycrystalline workpiece may be joined to a single-crystal workpiece by FSW according to the present invention. The flexibility of the present process in joining workpieces of various composition, structure, and processing allows articles to be manufactured having properties tailored to the localized demands of the specific application. For instance, an expensive high temperature alloy could be placed only in those areas on an article where temperatures reach beyond a certain point. The bulk of the article could be made of a less costly structural material that is joined by FSW to the high temperature alloy to form a tailored component.

Articles made by the method described above include machine components, such as components used in turbomachinery. In certain embodiments, the welded elements are assembled to form a component of a turbine engine, for instance a gas turbine engine or a steam turbine engine. The advantages of the present invention allow for the assembly of very large structural components of a turbine engine, such as ducts, frames, and cases. In advanced turbine designs, these components may be too large to be made in a single forging or casting, and thus the ability to use FSW to assemble these components is advantageous to cost effective turbine manufacture.

To fully exploit the advantages described above, a further embodiment of the present invention is a turbine engine component manufactured by the method of the present invention. In this particular embodiment, the method comprises providing an FSW apparatus 100 comprising a weld tool 102. The weld tool 102 comprises at least one tungsten-based refractory material selected from the following group:

a. a sintered alloy consisting essentially of tungsten, b. a metal comprising sintered and extruded tungsten and further comprising about 20 parts per million potassium, c. a metal comprising at least one of a) sintered metal and b) sintered and hot isostatically pressed metal, wherein said metal further comprises about 25 weight percent rhenium and the balance comprises tungsten, d. a cast and extruded tungsten-based refractory material, said material comprising about 4 weight percent rhenium, and about 0.5 weight percent hafnium carbide, and the balance comprising tungsten, and e. a cast and extruded tungsten-based refractory material, said material comprising from about 0.5 weight percent to about 2 weight percent hafnium carbide, and the balance tungsten.

A plurality of workpieces 108 is provided. A first workpiece comprises a first material, and a second workpiece comprises a second material, and said first material is substantially different from said second material in at least one of chemical composition, microstructure, and processing. At least one of said first material and said second material comprises a material selected from the group consisting of a steel, a stainless steel, a nickel-based superalloy, a cobalt-based superalloy, an iron-based superalloy, a nickel-iron-based superalloy, an oxide dispersion strengthened nickel alloy, and a titanium-based alloy.

Apparatus 100 is operated to weld the plurality of workpieces by FSW to form a plurality of welded elements, where each of the welded elements comprises a friction stir welded region, and the elements are then assembled to form the turbine engine component.

EXAMPLES

The following examples are presented to further illustrate certain embodiments of the present invention, and should not be construed as limiting the invention in any way.

Example 1

A friction stir welding tool made of II-13 tool steel was used in an attempt to weld via FSW a workpiece made of the nickel-based superalloy Alloy 718. Tool steel is a material commonly used to fabricate tools for FSW of aluminum workpieces. However, when applied to the Alloy 718 workpiece in this example, the tool made of tool steel was unable to bear the stress needed to plunge the tool into the workpiece, and the tool fractured during the initial stages of processing.

Example 2

A friction stir welding tool made of a sintered tungsten alloy containing about 25 weight percent rhenium was used in an attempt to weld via FSW a workpiece made of Alloy 718. Unlike the conventional tool made of tool steel in Example 1, the tungsten-rhenium tool remained intact throughout the welding process, and successfully welded the workpiece. Metallographic examination of the weld in cross section detected a number of small debris particulates entrapped in the weld from the wear of the tool during the FSW process. Although a strong bond was formed, the number and size of entrapped particulates would render the weld unacceptable in certain critical applications involving high stress and elevated temperatures.

Example 3

A friction stir welding tool made of a cast and extruded tungsten alloy containing about 4 weight percent rhenium and about 0.5 weight percent hafnium carbide was used in an attempt to weld one workpiece made of titanium alloy Ti17 to another workpiece made of Ti6-4. This tool remained intact throughout the welding process and successfully welded the workpiece, as did the tool in Example 2. Metallographic examination of the weld in cross section did not detect any of the debris particulates observed in Example 2.

While various embodiments are described herein, it will be appreciated from the specification that various combinations of elements, variations, equivalents, or improvements therein may be made by those skilled in the art, and are still within the scope of the invention as defined in the appended claims.

What is claimed is:

1. An apparatus for friction stir welding, comprising:
a weld tool comprising a tungsten-based refractory material, said material comprising doped tungsten, wherein said doped tungsten comprises dopant material and tungsten, said dopant material being present in a concentration of up to about 100 parts per million.

2. The apparatus of claim 1, wherein said concentration of said dopant material is in the range from about 10 parts per million to about 80 parts per million.

3. The apparatus of claim 1, wherein said dopant material comprises at least one material selected from the group consisting of lithium, sodium, potassium, rubidium, cesium, lanthanum oxide, yttrium oxide, cerium oxide, and thorium oxide.

4. The apparatus of claim 3, wherein said dopant material comprises potassium.

5. The apparatus of claim 4, wherein said concentration of said potassium is about 20 parts per million.

6. The apparatus of claim 1, wherein said doped tungsten comprises sintered and extruded doped tungsten.

7. An apparatus for friction stir welding, comprising:
a weld tool comprising tungsten-based refractory material, said material comprising an alloy comprising a solid-solution-strengthening material and tungsten, wherein said alloy comprises up to about 40 weight percent of said solid-solution-strengthening material.

8. The apparatus of claim 7, wherein said alloy comprises from about 20 weight percent to about 30 weight percent of said solid-solution-strengthening material.

9. The apparatus of claim 7, wherein said solid-solution-strengthening material comprises at least one material selected from the group consisting of rhenium, molybdenum, tantalum, and niobium.

10. The apparatus of claim 9, wherein said alloy comprises about 25 weight percent rhenium and the balance comprises tungsten.

11. The apparatus of claim 7, wherein said tungsten-based refractory material comprises at least one material selected from the group consisting of a) sintered material and b) sintered and hot isostatically pressed material.

12. An apparatus for friction stir welding, comprising:
a weld tool comprising a tungsten-based refractory material, said material comprising tungsten and at least one material selected from the group consisting of a solid-solution-strengthening material and a refractory carbide material, wherein said solid-solution-strengthening material is present within said tungsten-based refractory material at a concentration up to about 8 weight percent, and wherein said refractory carbide material is present within said tungsten-based refractory material a concentration in the range from about 0.25 weight percent to about 2 weight percent.

13. The apparatus of claim 12, wherein said solid-solution-strengthening material is present within said tungsten-based refractory material at a concentration in the range from about 2 weight percent to about 6 weight percent, and wherein said refractory carbide material is present within said tungsten-based refractory material a concentration in the range from about 0.25 weight percent to about 1 weight percent.

14. The apparatus of claim 12, wherein said solid-solution-strengthening material comprises at least one material selected from the group consisting of rhenium, molybdenum, tantalum, and niobium.

15. The apparatus of claim 12, wherein said refractory carbide comprises a carbide of at least one material selected from the group consisting of hafnium, zirconium, tantalum, and niobium.

16. The apparatus of claim 12, wherein said tungsten-based refractory material comprises about 4 weight percent rhenium and further comprises about 0.5 weight percent hafnium carbide, and wherein the balance comprises tungsten.

17. The apparatus of claim 12, wherein said tungsten-based refractory material comprises one of a) cast and extruded material; b) cast and forged material; c) consolidated and extruded material.

18. An apparatus for friction stir welding, comprising:
a weld tool comprising a tungsten-based refractory material, wherein said weld tool comprises a shoulder portion and a pin portion, said pin portion comprising said tungsten-based refractory material, wherein said shoulder portion comprises a material that is substantially different from the material comprising said pin portion in at least one characteristic selected from the group consisting of chemical composition, microstructure, and processing.

19. An apparatus for friction stir welding, comprising:
a weld tool comprising a tungsten-based refractory material, said metal comprising sintered and extruded tungsten and further comprising about 20 parts per million potassium.

20. An apparatus for friction stir welding, comprising:
a weld tool comprising a tungsten-based refractory material, said material comprising at least one material selected from the group consisting of a) sintered metal and b) sintered and hot isostatically pressed metal, wherein said material further comprises about 25 weight percent rhenium and the balance comprises tungsten.

21. An apparatus for friction stir welding, comprising:
a weld tool comprising a cast and extruded tungsten-based refractory material, said material comprising about 4 weight percent rhenium, and about 0.5 weight percent hafnium carbide, and the balance comprising tungsten.

22. A weld tool for friction stir welding, said tool comprising: a tungsten-based refractory material comprising sintered and extruded doped tungsten, wherein said doped tungsten comprises dopant material and tungsten, said dopant material being present in a concentration of up to about 100 parts per million.

23. The weld tool of claim 22, wherein said concentration of said dopant material is in the range from about 10 parts per million to about 80 parts per million.

24. The weld tool of claim 22, wherein said dopant material comprises at least one material selected from the group consisting of lithium, sodium, potassium, rubidium, cesium, lanthanum oxide, yttrium oxide, cerium oxide, and thorium oxide.

25. The weld tool of claim 24, wherein said dopant material comprises potassium.

26. The weld tool of claim 25, wherein said concentration of said potassium is about 20 parts per million.

27. A weld tool for friction stir welding, said tool comprising:
a tungsten-based refractory material comprising an alloy comprising a solid-solution-strengthening material and tungsten, wherein said alloy comprises up to about 40 weight percent of said solid-solution-strengthening material.

28. The weld tool of claim 27, wherein said alloy comprises from about 20 weight percent to about 30 weight percent of said solid-solution-strengthening material.

29. The weld tool of claim 27, wherein said solid-solution-strengthening material comprises at least one material selected from the group consisting of rhenium, molybdenum, tantalum, and niobium.

30. The weld tool of claim 29, wherein said alloy comprises about 25 weight percent rhenium and the balance comprises tungsten.

31. The weld tool of claim 27, wherein said tungsten-based refractory material comprises at least one material selected from the group consisting of a) sintered material and b) sintered and hot isostatically pressed material.

32. A weld tool for friction stir welding, said tool comprising: tungsten and at least one material selected from the group consisting of a solid-solution-strengthening material and a refractory carbide material, wherein said solid-state-strengthening material is present within said tungsten-based refractory material at a concentration up to about 8 weight percent, and wherein said refractory carbide material is present within said tungsten-based refractory material a concentration in the range from about 0.25 weight percent to about 2 weight percent.

33. The weld tool of claim 32, wherein said solid-solution-strengthening material is present within said tungsten-based refractory material at a concentration in the range from about 2 weight percent to about 6 weight percent, and wherein said refractory carbide material is present within said tungsten-based refractory material a concentration in the range from about 0.25 weight percent to about 1 weight percent.

34. The weld tool of claim 32, wherein said solid-solution-strengthening material comprises at least one material selected from the group consisting of rhenium, molybdenum, tantalum, and niobium.

35. The weld tool of claim 32, wherein said refractory carbide comprises a carbide of at least one material selected from the group consisting of hafnium, zirconium, tantalum, and niobium.

36. The weld tool of claim 32, wherein said tungsten-based refractory material comprises about 4 weight percent rhenium and further comprises about 0.5 weight percent hafnium carbide, and wherein the balance comprises tungsten.

37. The weld tool of claim 32, wherein said tungsten-based refractory material comprises cast and thermo-mechanically processed material.

38. The weld tool of claim 37, wherein said cast and thermo-mechanically processed material comprises at least one material selected from the group consisting of a) cast and extruded material; b) cast and forged material; and c) consolidated and extruded material.

39. A weld tool for friction stir welding, said tool comprising: a shoulder portion and a pin portion, wherein said shoulder portion comprises a material that is substantially different from the material comprising said pin portion in at least one characteristic selected from the group consisting of chemical composition, microstructure, and processing; and wherein said pin portion comprises a tungsten-based refractory material.

40. A weld tool for friction stir welding, comprising:
a tungsten-based refractory material, said metal comprising sintered and extruded tungsten and further comprising about 20 parts per million potassium.

41. A weld tool for friction stir welding, comprising:
a tungsten-based refractory material, said metal comprising at least one material selected from the group consisting of a) sintered metal and b) sintered and hot isostatically pressed metal, wherein said metal further comprises about 25 weight percent rhenium and the balance comprises tungsten.

42. A weld tool for friction stir welding, comprising:
a cast and extruded tungsten-based refractory material, said material comprising about 4 weight percent rhenium, and about 0.5 weight percent hafnium carbide, and the balance comprising tungsten.

43. A method for making a weld tool for friction stir welding, said method comprising:
  providing a tungsten-based refractory material;
  processing said material to form a substantially self-supporting feedstock;
  working said feedstock, wherein working reduces a cross-sectional area of said feedstock by at least 50%; and
  fashioning said feedstock into a weld tool adapted to operate in a friction stir welding apparatus.

44. The method of claim 43, wherein working reduces said cross-sectional area of said feedstock by at least 75%.

45. The method of claim 43, wherein processing comprises at least one processing operation selected from the group consisting of sintering isostatic pressing, are deposition, plasma spray deposition, laser deposition, and casting.

46. The method of claim 43, wherein working comprises at least one operation selected from the group consisting of extruding, swaging, and forging.

47. The method of claim 43, wherein said tungsten-based refractory material comprises at least one material selected from the group consisting of a) tungsten, b) doped tungsten, c) an alloy comprising tungsten and rhenium, and d) a material comprising tungsten and at least one material selected from the group consisting of rhenium and hafnium carbide.

48. A method for manufacturing an article, said method comprising:
  providing a friction stir welding apparatus, wherein said apparatus comprises a weld tool, said weld tool comprising at least one tungsten-based refractory material selected from the group consisting of
    a. doped tungsten, wherein said doped tungsten comprises dopant material and tungsten, said dopant material being present in a concentration of up to about 100 parts per million,
    b. an alloy comprising a solid-solution-strengthening material and tungsten, wherein said alloy comprises up to about 40 weight percent of said solid-solution-strengthening material, and
    c. tungsten and at least one material selected from the group consisting of a solid-solution-strengthening material and a refractory carbide material, wherein said solid-state-strengthening material is present within said tungsten-based refractory material at a concentration up to about 8 weight percent, and wherein said refractory carbide material is present within said tungsten-based refractory material a concentration in the range from 0.25 weight percent to about 2 weight percent;
  providing at least one workpiece; and
  operating said apparatus to weld said at least one workpiece by friction stir welding to form at least one welded element, said at least one welded element comprising a friction stir welded region.

49. The method of claim 48, wherein providing said at least one workpiece comprises providing at least one material selected from the group consisting of a steel, a stainless steel, a nickel-based superalloy, a cobalt-based superalloy, an iron-based superalloy, a nickel-iron-based superalloy, an oxide dispersion strengthened nickel alloy, and a titanium-based alloy.

50. The method of claim 49, wherein said at least one workpiece comprises at least one item selected from the group consisting of a forged item, a cast item, an extruded item, a rolled item, and an item formed by a powder metallurgy process.

51. The method of claim 48, wherein providing said at least one workpiece comprises providing a plurality of workpieces; and
  wherein operating comprises operating said apparatus to weld said plurality of workpieces by friction stir welding to form at least one welded element, wherein each welded element comprises a friction stir welded region.

52. The method of claim 51, wherein said method further comprises assembling said at least one welded element to form said article.

53. The method of claim 52, wherein assembling comprises friction stir welding at least two of said welded elements to join said elements.

54. The method of claim 52, wherein assembling comprises assembling said plurality of welded elements to form a component of a turbine engine.

55. The method of claim 54, wherein said component of said turbine engine comprises one of a duct, a frame, a disk, and a case.

56. The method of claim 51, wherein a first workpiece comprises a first material, and a second workpiece comprises a second material, wherein said first material is substantially different from said second material in at least one characteristic selected from the group consisting of chemical composition, microstructure, and processing.

57. The method of claim 56, wherein at least one material selected from the group consisting of said first material and said second material comprises a material selected from the group consisting of a steel, a stainless steel, a nickel-based superalloy, a cobalt-based superalloy, an iron-based superalloy, a nickel-iron-based superalloy, an oxide dispersion strengthened nickel alloy, and a titanium-based alloy.

58. The method of claim 48, wherein said tungsten-based refractory material comprises said doped tungsten.

59. The method of claim 58, wherein said dopant material comprises at least one material selected from the group consisting of lithium, sodium, potassium, rubidium, cesium, lanthanum oxide, yttrium oxide, cerium oxide, and thorium oxide.

60. The method of claim 58, wherein said doped tungsten comprises sintered and extruded doped tungsten.

61. The method of claim 48, wherein said tungsten-based refractory material comprises said alloy comprising said solid-solution-strengthening material and tungsten.

62. The method of claim 61, wherein said solid-solution-strengthening material comprises at least one material selected from the group consisting of rhenium, molybdenum, tantalum, and niobium.

63. The method of claim 62, wherein said alloy comprises about 25 weight percent rhenium and the balance comprises tungsten.

64. The method of claim 61, wherein said tungsten-based refractory material comprises at least one material selected from the group consisting of a) sintered material and b) sintered and hot isostatically pressed material.

65. The method of claim 48, wherein said tungsten-based refractory material comprises tungsten and at least one material selected from the group consisting of a solid-solution-strengthening material and a refractory carbide material.

66. The method of claim 48, wherein said tungsten-based refractory material comprises about 4 weight percent rhenium and further comprises about 0.5 weight percent hafnium carbide, and wherein the balance comprises tungsten.

67. The method of claim 48, wherein said tungsten-based refractory material comprises one of a) cast and extruded material, b) cast and forged material, and c) consolidated and extruded material.

68. The method of claim 48, wherein said welded article comprises a component for use in a turbine engine.

69. A method for manufacturing an article, said method comprising:
   providing a friction stir welding apparatus, wherein said apparatus comprises a weld tool, said weld tool comprising a tungsten-based refractory material selected from the group consisting of
   a. a metal comprising sintered and extruded tungsten and further comprising about 20 parts per million potassium,
   b. a metal comprising at least one material selected from the group consisting of a) sintered metal and b) sintered and hot isostatically pressed metal, wherein said metal further comprises about 25 weight percent rhenium and the balance comprises tungsten, and
   c. a cast and extruded tungsten-based refractory material, said material comprising about 4 weight percent rhenium, and about 0.5 weight percent hafnium carbide, and the balance comprising tungsten;
   providing at least one workpiece, said at least one workpiece comprising at least one material selected from the group consisting of a nickel-based superalloy, a cobalt-based superalloy, an iron-based superalloy, a nickel-iron-based superalloy, and a titanium-based alloy; and
   operating said apparatus to weld said at least one workpiece by friction stir welding to form a welded article.

* * * * *